United States Patent [19]

Oda et al.

[11] Patent Number: 5,361,728
[45] Date of Patent: Nov. 8, 1994

[54] PRESSURIZED FLUIDIZED BED COMBUSTION BOILER SYSTEM

[75] Inventors: Noriyuki Oda; Akira Toriyama, both of Tokyo; Katsumi Higashi; Hiroshi Maeno, both of Kawasaki; Tetsuya Kunitaka, Shin; Junichi Iritani, Chigasaki; Hideki Goto, Chofu, all of Japan

[73] Assignees: Asahi Glass Company Ltd.; Electric Power Development Co., Ltd., both of Tokyo, Japan

[21] Appl. No.: 120,388

[22] Filed: Sep. 14, 1993

[30] Foreign Application Priority Data

Oct. 2, 1992 [JP] Japan .................. 4-289322

[51] Int. Cl.$^5$ .............................. F22B 1/00
[52] U.S. Cl. ....................... 122/4 D; 55/318; 55/319; 110/216
[58] Field of Search .............. 55/315, 318, 319; 122/4 D; 110/216

[56] References Cited

U.S. PATENT DOCUMENTS

| | | |
|---|---|---|
| 4,584,003 | 4/1986 | Oda et al. . |
| 4,599,952 | 7/1986 | Meier ............................ 110/216 |
| 4,669,395 | 6/1987 | Brannstrom ..................... 110/216 |
| 4,904,287 | 2/1990 | Lippert et al. . |
| 5,025,755 | 6/1991 | Eickvonder et al. ........... 122/4 D |
| 5,078,760 | 1/1992 | Haldipur et al. . |
| 5,094,673 | 3/1992 | Kilicaslan et al. . |

FOREIGN PATENT DOCUMENTS

| | | |
|---|---|---|
| 62-279821 | 12/1987 | Japan . |
| 63-229116 | 9/1988 | Japan . |
| 222689 | 5/1990 | Japan . |
| 222690 | 5/1990 | Japan . |
| 2198606 | 8/1990 | Japan . |
| 4326916 | 11/1992 | Japan . |
| 550324 | 7/1993 | Japan . |

*Primary Examiner*—Edward G. Favors
*Attorney, Agent, or Firm*—Oblon, Spivak, McClelland, Maier & Neustadt

[57] ABSTRACT

A pressurized fluidized bed combustion boiler system comprising: a boiler; a filtration apparatus with ceramics filters in a flue gas system; and a louver separator as a primary stage dust separator disposed between the boiler and the filtration apparatus.

11 Claims, 10 Drawing Sheets

PRESSURIZED FLUIDIZED BED COMBUSTION BOILER SYSTEM

BACKGROUND OF THE INVENTION

1. Field of the Invention

This invention relates to a pressurized fluidized bed combustion (PFBC) boiler system which attracts expectation as a means for a new coal-fired generation plant of next generation, since $SO_x$ or $NO_x$ contained in an emitted flue gas is remarkably reduced, and the system is provided with a high efficiency.

2. Discussion of Background

In a coal-fired power generation plant employing a PFBC boiler system, lime stone or dolomite is charged into a fluidized bed, and the combustion is carried out at a comparatively low temperature. Therefore, $SO_x$ is fixed as a sulfur compound and is removed, the emission of $NO_x$ is reduced. The plant is provided with a high efficiency, since the power generation is performed by both a steam turbine which is driven by steam produced by the boiler, and a gas turbine which is driven by a filtered pressurized hot flue gas. Accordingly, much effort has been paid in advanced countries for the development of a power generation plant in use of this PFBC boiler system wherein the realization thereof is intended.

The reason why a filtration apparatus for removing dusts of a hot flue gas is necessary for the power generation plant having the PFBC boiler system, is that blades or vanes of a gas turbine should not be eroded by dusts such as ash of coal, when the gas turbine is driven by a pressurized hot flue gas. FIG. 9 is a schematic diagram showing an example of a power generation plant having a conventional PFBC boiler system.

In FIG. 9, a reference numeral 90 designates a PFBC boiler, 100, a pressure vessel which accommodates a main body of a boiler 101, cyclone separators 102 and 103, and a bed material container 104, 110, a flue gas pipe, 120, a gas turbine, 130, a waste heat boiler, 140, a bag filter and 150, a chimney.

The reason why the cyclone separators are mainly adopted in a fluid catalytic cracking apparatus (FCC) that is currently in practice, or a power generation plant of a conventional or under development PFBC boiler system, is that a practical filtration means which can remove dusts of a hot gas, up to a level wherein the blades or vanes of a gas turbine do not erode in a short time, has not been found other than the cyclone separators. The cyclone separator is provided with an advantage wherein the structure thereof is simple, the high temperature design is easy and the dust removing efficiency is high.

In the conventional PFBC power generation plank, for instance, a pressurized flue gas which has been filtered only by the cyclone separators, is led to a gas turbine having an improved abrasion resistance, and the flue gas exhausted from the gas turbine of which temperature is lowered, is filtered by bag filters or by an electrostatic precipitator to satisfy the environmental criterion.

However, when the boiler is in a transient state, a large amount of dusts containing unburnt ingredients are often emitted. At this moment, a phenomenon is apt to cause wherein a dust discharge port of a cyclone separator is clogged (bridged), a large amount of dusts overflow the cyclone separator, and a flue gas containing a high concentration (10 to 30 times as much as design value) of dusts flows into the gas turbine, whereby there is a high danger of eroding the blades or vanes of the gas turbine in a short time.

Accordingly, a construction is intended as an improved power generation plant, as shown in FIG. 10, wherein the erosion of the blades or vanes of the gas turbine is avoided by disposing the cyclone separators as the primary stage filtration, and providing a filtration apparatus with ceramics filters which is excellent in the dust removing efficiency, on the downstream side of the cyclone separators. In FIG. 10, a reference numeral 1 designates a filtration apparatus with ceramics filters. In this plant, the bag filter 140 in FIG. 9 is not necessary, since the dust removing efficiency of the filtration apparatus with ceramics filters is excellent.

As a large-scaled filtration apparatus with ceramics filters which can be used in a power generation plant, there is a so-called candle type filtration apparatus, proposed in U.S. Pat. Nos. 4,904,287, 5,094,673 and the like, wherein filter tubes are provided of which one-side ends are closed and of which other-side ends are open. Further, tubular type filtration apparatus are proposed of which outline diagram is shown in FIG. 10, and which is provided with a plurality of filter tubes of which both ends are open, and flow passages of a dust containing gas are provided on the inner side of the filter tubes, in Japanese Examined Patent Publication No. 40567/1988, Japanese Examined Patent publication No. 22689/1990, Japanese Examined Patent publication No. 22690/1990, Japanese Examined Patent publication No. 24251/1991, Japanese Examined Patent publication No. 56086/1991, Japanese Examined Patent publication No. 50324/1993, Japanese Unexamined Patent Publication No. 279821/1987, Japanese Unexamined Patent Publication No. 229116/1988, Japanese Unexamined Patent Publication No. 326916/1992 and the like. Further, crossed-flow type filtration apparatus are proposed wherein crossed-flow type filter units are provided, in Japanese Unexamined Patent Publication No. 198606/1990 and U.S. Pat. No. 5,078,760.

In adopting the candle type filtration apparatus as a filtration apparatus with ceramics filters, it is difficult to always maintain a flow of a dust containing gas in the whole region of a filtering chamber wherein the filter tubes are disposed, since a flow area of the dust containing gas in the filtering Chamber wherein the filter tubes are accommodated, is relatively large in this type of filtration apparatus, and there is a tendency wherein a large amount of dusts build up on surfaces of the filter tubes at portions wherein the flow of the dust containing gas is stagnant. Accordingly, it is necessary to remove a considerably large portion of dusts at the primary stage filtration apparatus. A construction is selected wherein cyclone separators having a high dust removing efficiency are employed in the primary stage.

The PFBC boiler system having the filtration apparatus with ceramics filters on the downstream side of the cyclone separators, is devoid of reliability when a transient state is caused. That is, when a large amount of dusts containing unburnt ingredients reach the cyclone separators, the dusts to be removed in the cyclone separatos are apt to temporarily clog dust discharge ports and overflow the cyclone separators. In this case, a flue gas containing high-concentration dusts which have not been removed, flows into the filtration apparatus with ceramics filters, as it is.

At this moment, there often causes a trouble wherein the large amount of dusts containing unburnt ingredients are accumulated on the surfaces of the ceramics filters, especially on the surfaces of the ceramics filters at a portion wherein a gas velocity is retarded whereby the dusts are apt to build up, and the dusts containing unburnt ingredients are ignited and combusted on the ceramics filters. When this combustion is rapidly caused and the ceramics filters are rapidly heated, which exceeds a limit of a thermal shock allowable for the ceramics filters, cracks are generated in the ceramics filters. Further, when the combustion is more violent, the ceramics filter may be damaged by melting.

Such a transient state is caused, for instance, in the operation of rapidly increasing the combustion load, when the gas temperature in the PFBC boiler is 600° C. or less. In spite of a high oxygen concentration, a large amount of unburnt ingredients including soot (in some case as high as 30 wt % of dusts) are emitted, and sometimes, carbon monoxide of which concentration is over 1000 ppm is detected.

Further, in case of the operation wherein the fuel of the boiler is switched from oil to coal, at the start-up of the operation of the boiler, even when the temperature inside the boiler is elevated to about 800° C., a post bed combustion may be caused in the cyclone separators depending on the moisture content of a coal-water mixture or a kind of coal. In this case, the temperature of the dust containing gas being introduced to the filtration apparatus with ceramics filters is suddenly elevated in an amount to 200 through 500° C., which will cause thermal damages of the ceramics filters.

Further, when a large amount of air is blown into the boiler, in an emergency shut down or for the operation to retain perforations of a combustion air distribution plate, the unburnt ingredients in the boiler are blown from the boiler in a large amount, as they are, which overflow the cyclone separators, and the unburnt ingredients reach the filtration apparatus with ceramics filters while they are burning.

Further, the inside of the cyclone separator is provided with a lower narrow portion wherein the dust containing gas swirls and a reaction between the unburnt component and the oxygen in the flue gas is accelerated at that portion. Therefore, the ignition and combustion are also caused in the cyclone separators, the temperature of the flue gas is rapidly elevated and the portion of the cyclone separator may be damaged by melting. Further, when the temperature-elevated flue gas flows into the filtration apparatus with ceramics filters, the ceramics filters may suffer thermal damages.

When the ceramics filters are thermally damaged, the broken pieces of the ceramics filters directly hit and damage the blades or vanes of the gas turbine, the blades or vanes of the gas turbine are eroded by the entrained dusts, and are consumed in a short time period. Therefore, all of these troubles are serious to a power generation plant. These transient phenomena are mostly temporary and caused in a closed room. Therefore, the actual situation thereof is difficult to determine. Conventionally, the breakage of the ceramics filters have been ascribed to its brittleness. However, the inventors have confirmed the presence of these phenomena and the breakage of the filter tubes due to the thermal damage, by a simulated calculation.

In order for the filtration apparatus with ceramics filters to cope with the variable hot dust containing gas, it is necessary to increase the treating capacity of the filtration apparatus with ceramics filters, to provide a means for preventing the rapid elevation of temperature, to frequently perform the regeneration by backwashing, and to find out a means for preventing the accumulation of the dusts containing unburnt ingredients in a large amount. That is to say, it is necessary to provide a filtration apparatus having flexibility whereby the operation is possible without the cyclone separators. However, the necessary expenditure therefor is never small.

However, another big problem is that the necessary cost for installing the PFBC boiler system is enhanced, since plural stages of cyclone separators are accommodated in a pressure vessel which is shared by the PFBC boiler, to achieve the high dust removing efficiency, and therefore, the inner volume of the pressure vessel is increased by the portion of accommodating the cyclone separators. Even if the cyclone separators which treat the hot pressurized dust containing gas are separated from the pressure vessel, it is necessary to make the cyclone separators per se in an expensive bulky pressure vessel, the heat loss dissipated from the surface of the cyclone separator increases, and therefore, the problem can not be solved.

In the filtration apparatus with ceramics filters, to prevent dusts containing a large amount of unburnt ingredients from accumulating in a large amount on the ceramics filters, a mean is effective wherein the filtration apparatus is constructed so that a portion of the dust containing gas is extracted from a dust collecting hopper in the filtration apparatus, the dust containing gas in the filtering chamber of the filtration apparatus flows downwardly, and the layer of the dusts separated from the ceramics filters by the back-washing are swiftly transferred to the hopper. The filtration apparatus with ceramics filters having such a construction, is proposed, for instance, in Japanese Examined Patent Publication No. 24251/1991.

In the tubular type filtration apparatus proposed in Japanese Examined Patent Publication No. 24251/1991, the flow area of the dust containing gas in the filtering chamber is relatively small, and the flow of the dust containing gas is basically a down flow. The dust containing gas is filtered while flowing down in the filter tubes 3, and therefore, the flow velocity of the dust containing gas is almost nullified at around the bottom ends of the filter tubes, when the dust containing gas is not extracted from the hopper.

Moreover, there causes a significant difference in the flow velocity of the dust containing gas among the filter tubes, since it is inevitably influenced by the pressure distribution (there is a difference of approximately 70 mmWC at maximum) and the velocity distribution of the dust containing gas in a gas inlet chamber which fluctuate from moment to moment in accordance with the fluctuation at the upstream portion of the plant. Therefore, the velocity of the downward flow of the dust containing gas may be an up flow at the lower ends of some filter tubes.

In the tubular type filtration apparatus, when the blow down is performed whereby a comparatively small amount of dust containing gas is extracted from the hopper, the downward flow velocity of the dust containing gas in the vicinity of the bottom ends of the filter tubes can be maintained, since the flow area of the dust containing gas in the filtering chamber is relatively small. Accordingly, the quantity of dusts accumulated on the inner surfaces of the filter tubes in the vicinity of the bottom end of the filter can be reduced, the frequency of the regeneration by back-washing of the ceramics filters can be reduced, and the filtration apparatus can maintain a high filtering capacity.

When the quantity of dusts accumulated on the surfaces of the filter tubes is small, normally, a combustion heat enough to thermally damage the filter tubes is not generated, even when the unburnt ingredients are contained in the dusts by approximately 10% and are combusted continually. However, even in the tubular type filtration apparatus, when a large amount of unburnt ingredients which are transiently emitted are introduced, the dusts are accumulated in a large amount on the inner surfaces of the filter tubes in the vicinity of the bottom ends of the filter tubes wherein the downward flow velocity of the dust containing gas is minimized, which are ignited and combusted and thermally damage the filter tubes.

In case of blowing down the dust containing gas from the hopper, it is preferable to return the extracted dust containing gas to the upstream side of the filtration apparatus with ceramics filters, as is proposed in Japanese Examined Patent Publication No. 24251/1991. However, it is difficult to procure a blower which can return the pressurized hot dust containing gas, and a considerable expenditure is required even when it is procured.

The inventors proposed a filtration apparatus wherein a filtration apparatus with ceramics filters is integrated with a compact louver separator for the primary stage dust separation, with the purpose of filtering an emission gas from a blast furnace, previously in Japanese Unexamined Patent Publication No. 279821/1987.

In the louver separator, the dust containing gas is introduced into a space surrounded by a plurality of arranged vanes, the flow direction of the dust containing gas is forcibly changed by the vanes, the dusts having a large particle size or dusts having a large specific weight are moved by inertia in the flow direction of the introduced dust containing gas, or are impinged on the vanes thereby exhausting the kinetic energy and separating the dusts by the gravity. Therefore, the dust removing efficiency is not so high (the dust removing efficiency is 10 to 20% in case of fly ash having a mean particle size of 20 μm).

SUMMARY OF THE INVENTION

It is an object of the present invention to solve the above problems in the conventional technology, and to provide a PFBC boiler system capable of stably continuing the operation without any trouble such as the thermal damages of ceramics filters of a filtration apparatus which is provided in a flue gas system, even when a flue gas with a large amount of dusts containing unburnt ingredients is transiently emitted from a boiler, and is capable of reducing the installation cost.

According to an aspect of the present invention, there is provided a PFBC boiler system of this invention, which is a PFBC boiler system having a filtration apparatus with ceramics filters in a flue gas system of a boiler, wherein a louver separator is provided and not a cyclone separator, as a primary stage separator between the boiler and the filtration apparatus with ceramics filters.

DETAILED DESCRIPTION OF THE PREFERRED EMBODIMENTS

Figure 1:
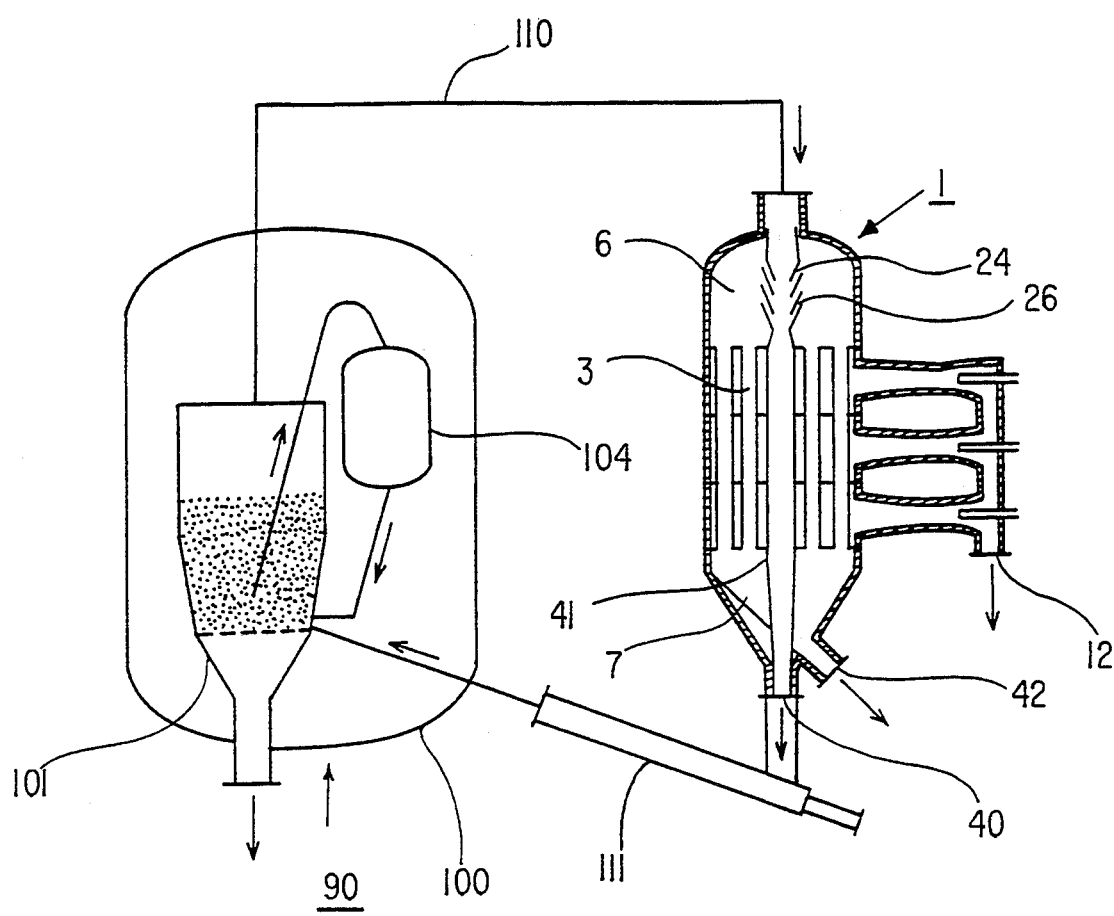
FIG. 1 is a schematic diagram showing an example of a PFBC boiler system according to the present invention.

In the PFBC boiler system of this invention, since the louver separator is provided at the primary stage of the filtration apparatus with ceramics filters, there is no over-flowing as in the cyclone separator, in a transient state wherein a large amount of dusts containing unburnt ingredients are emitted from a boiler, and the louver separator continuously maintains the separating function. Therefore, the quantity of dusts flowing into the filtration apparatus with ceramics filters is always reduced.

In the louver separator, the flying time wherein the dusts reach a discharge port is short, and even when a large amount of dusts transiently come to the louver separator, the dusts having a comparatively large specific weight or coarse dusts (most of the dusts are combustible in the PFBC boiler) are firmly separated, and the dusts do not overflow as in the cyclone separator wherein the discharge port of dust is bridged by the dusts. Therefore, the filtering function can be maintained. Further, the size of the louver separator is compact with respect to the treating capacity of the dust containing gas.

A preferable example of a construction wherein a louver separator is integrated into a pressure vessel which is shared by a filtration apparatus with ceramics filters, is proposed, for instance, in Japanese Unexamined Patent Publication No. 279821/1987. In this example, the vanes of the louver separator are provided in a pyramid form, in a gas inlet chamber which is disposed in the filtration apparatus with ceramics filters, a dust discharge pipe is extended downwardly, and an outlet of the dust discharge pipe is provided in a hopper which collects dusts in the filtration apparatus. By flowing the dust containing gas in the louver separator in an approximately vertical direction as in this case, the dusts are efficiently separated with help of the gravity other than the inertia, and are firmly transferred to the hopper at the lower position of the apparatus and the like through the dust discharge pipe.

Further, since the dusts removed by the louver separator in the transient state, are comparatively large in their particle sizes, and contain much unburnt ingredient, a ratio of burnt-out incombustible ash particles in the dusts transferred to the filtration apparatus with ceramics filters is large as compared to the dusts in the boiler flue gas, the dusts accumulated on the ceramics filters are hard to combust, a violent combustion is hard to cause even if the dusts are ignited and combusted, and the thermal damage of the ceramics filter is hard to cause.

Further, the vanes of the louver separator function as heat accumulators. When the temperature of the flue gas sent from the boiler is rapidly elevated, the vanes temporarily take heat from the flue gas and alleviate the temperature elevation, thereby retarding the increasing rate of the temperature of the dust containing gas reaching the ceramics filters. Also in this view, the thermal damages of the ceramics filters are avoided.

Further, the installation cost of a pressure vessel which contains a hot gas having, for instance, a pressure of approximately 15 kg/cm$^2$ and a temperature of approximately 850° C., is approximately proportional to its inner volume. Therefore, when the louver separator is designed so that it has the dust removing efficiency of not more than 80%, the louver separator can considerably be made compact in comparison with a cyclone separator having the same efficiency. Accordingly, a space is economized which accommodates the primary stage dust separator owing to its compactness. The inner volume of a pressure vessel can considerably be reduced in case of accommodating a louver separator in a pressure vessel accommodating a boiler, or a pressure vessel of a filtration apparatus with ceramics filters, or a pressure vessel of its own.

The economizing effect of the inner volume of a pressure vessel by the change of the kind of the primary stage dust separator, is significant. For instance, in case of a PFBC boiler system employed in a power generation plant having a rated capacity of 350 MW, when cyclone separators are adopted in the primary stage filtration apparatus, and contained in a pressure vessel which is shared by a boiler, the dimension of the pressure vessel is; outer diameter 18 m×height 40 m. By contrast, when the cyclone separators are eliminated, the dimension can be reduced approximately to the outer diameter 18 m×height 30 m, which economizes approximately 2500 m$^3$ in the inner volume of a pressure vessel. Since the cost of a pressure vessel is considerably influenced by its diameter, the installation cost can significantly be reduced, when the diameter of the pressure vessel accommodating a boiler can be reduced.

The increase of the volume of a pressure vessel in case of accommodating a louver separator in a pressure vessel which is shared by a filtration apparatus with ceramics filters, is at most 380 m$^3$. The cost economized by reducing the inner volume, is larger than the installation cost of the filtration apparatus with ceramics filters integrated with a louver separator that is needed for this plant. Further, when the pressure vessel accommodating the boiler is employed as an air reservoir of compressed air, the follow-up performance of an air supply quantity of compressed air with respect to a supply quantity of fuel, is promoted by reducing the inner volume. By these effects, the installation cost of a total of the power generation plant is economized, and the practical value of the power generation plant increases by that amount.

It is naturally possible to accommodate a louver separator in a pressure vessel which is shared by a PFBC boiler, and the similar cost economizing effect can be provided also in this case. In a louver separator, the flow area among the vanes of the louver separator is preferably constructed such that the flow area increases toward the outer side (downstream side) compared with the inner side (upstream side). In this case, the gas flow velocity gradually decreases between the blades, the dynamic pressure of flowing gas is again converted into the static pressure (called the diffuser effect). Therefore, the pressure drop of the dust containing gas by the louver separator can be minimized.

Further, when such a kind of louver separator is adopted, the distributions of the static pressure and the dynamic pressure of the dust containing gas in a gas inlet chamber of the filtration apparatus with ceramics filters are made uniform, and almost no turbulence is caused whereby an eddy flow or an upward flow is created in the flow of the dust containing gas in the gas inlet chamber or in the filtering chambers wherein the ceramics filters are accommodated.

Further, a portion between the vanes of the louver separator wherein the flow velocity of gas is large, can be employed as a portion of an ejector. That is, the portion between the vanes wherein the flow velocity of gas is large is a portion wherein the static pressure is low. Therefore, a blow down means can be constructed when the dust containing gas sucked from the dust collecting hopper to the gas passage is exhausted to the portion between the vanes wherein the static pressure is low.

For example, the vanes of the louver separator can be provided in a conical form, and this construction is very convenient to form diffusers between the vanes. By utilizing pipes of gas passages as props for supporting the vanes of the conically formed louver separator by penetrating the vanes, and providing suction ports in the pipes for sucking the dust containing gas from the hopper through the gas passages at places where the static pressure is minimized. This is a favorable construction.

The filtration apparatus with ceramics filters may be any one of the aforementioned candle type filtration apparatus, tubular type filtration apparatus and crossed-flow type filtration apparatus. However, the tubular type filtration apparatus is especially preferable since the apparatus is compact, the installation area can be reduced, it is convenient to collect the dusts trapped in the filter tubes to the hopper, since the flow of the dust containing gas in the filtering chambers is a down flow, and the blow down effect is excellent since the flow area of the dust containing gas in the filtering chambers is small.

In a preferable construction of an apparatus of this invention, a candle type filtration apparatus is adopted in the apparatus, which is improved by including the advantage of the tubular type filtration apparatus, and wherein a single or a plurality of filtration units are accommodated in a pressure vessel wherein the filtration units are arranged in the vertical direction or in the horizontal direction, and the flow of the dust containing gas in the filtering chamber is a down flow.

In another preferable PFBC boiler system of this invention, a blow down means is provided wherein a portion of the dust containing gas is extracted from a dust collecting hopper of a filtration apparatus with ceramics filters.

There are fine dusts in the dust containing gas which have not been separated by the louver separator. Accordingly, the fine dusts are filtered by the filtration apparatus with ceramics filters. The fine dusts are provided with a tendency wherein the fine dusts are apt to build up thickly on the surface of filters at a portion where the flow of the dust containing gas in the filtering chamber of the filtration apparatus, is stagnant. When the dusts are accumulated thickly on the surface of the filters, the pressure drops of the filters increase, the filtering capacity of the filtration apparatus is reduced, and the accumulated dusts are in a state of easy to ignite and combust.

When the blow down operation wherein a portion of the dust containing gas is extracted from the dust collecting hopper, is performed in such a filtration apparatus with ceramics filters, the portions in the filtering chamber, wherein the flow of the dust containing gas are stagnant, can be eliminated, and the dust containing gas always flows downwardly in the filtering chambers, thereby preventing to cause a disordered flow of the dust containing gas in the hopper and swiftly transfers the dusts which are floated in the gas by the back-washing, into the hopper. The blowing down quantity of the dust containing gas is, for instance, 2 to 25% of the dust containing gas being introduced to the filtration apparatus with ceramics filters.

In this way, the thickness of dusts accumulated on the surfaces of the ceramics filters can be reduced, or the frequency of the regeneration of the ceramics filter by back-washing can be reduced, the high filtering capacity of the filtration apparatus with ceramics filters can be maintained, and a danger can be excluded whereby the dusts accumulated on the filter are ignited and combusted causing the thermal damage of the ceramics filters. In the following explanation, these effects are summarized as the blow down effect.

The blow down means includes, a means for filtering the extracted dust containing gas and sending it to the downstream of a plant, a means for filtering and dust deposition, a means for returning extracted dust containing gas as it is to the upstream side of a plant and the like. To filter the extracted dust containing gas, it is necessary to introduce another filtration apparatus or separator having a small capacity. When the treating capacity of a filtration apparatus with ceramics filters of the first stage is large, the blow down may be performed by connecting in series a plurality of filtration apparatus having a small capacity.

In this case, since the quantity of the dust containing gas being extracted from the second filtration apparatus to the downstream stage is very small, the loss of energy is very little even if the dust containing gas is deposited as it is. In this construction, a portion of the dust containing gas is sent to the filtration apparatus at the downstream stage, by the pressure of the dust containing gas per se.

A cyclone separator can be employed as the small-capacity dust separator at the downstream stage, other than the filtration apparatus with ceramics filters. When a pertinent blower or fan can be procured which can be employed for returning the hot pressurized dust containing gas, it is a preferable construction to adopt a blow down means by integrating the blower or fan and a gas passage, thereby returning the dust containing gas to the vicinity of the gas inlet port of the filtration apparatus with ceramics filters.

Since it is not easy to procure a blower for returning the dust containing hot pressurized gas, in another preferable PFBC boiler system of this invention, an ejector and a gas passage is employed as a blow down means wherein a portion of energy of the dust containing gas introduced into the filtration apparatus with ceramics filters, is utilized, the dust containing gas extracted from the dust collecting hopper is sucked from one end of the gas passage, and is returned to the vicinity of a gas inlet port of the filtration apparatus with ceramics filters from the other end of the gas passage.

In this case, the energy of the dust containing gas which is dissipated by the ejector for returning the dust containing gas is small, and it is easy to make the ejector a heat resistant structure since the structure is simple, which is convenient for sending the hot pressurized gas. The blow down means composed of the ejector and the gas passage may be of one route when the capacity of the filtration apparatus with ceramics filters is not so large. However, in case of the filtration apparatus having a large capacity, it is preferable to provide a plurality of gas passages and ejectors (the numbers of both may not agree with each other), and to arrange a plurality of suction ports of the gas passages to make uniform the flow of the dust containing gas in the filtering chamber.

Further, when both of the ejectors and the gas passages are provided in a pressure vessel which accommodates the filtration apparatus with ceramics filters, the length of the gas passage can be shortened, the energy of the dust containing gas dissipated in the ejector can more be reduced, it is not necessary to provide a thermal insulation around the gas passage, and it is not necessary to construct the gas passage by a pressure piping.

The preferable quantity of the dust containing gas which should be blown down to provide a blow down effect, depends on the kind of the filtration apparatus with ceramics filters. For instance, in case of the tubular type filtration apparatus wherein the ceramics filters are of filter tubes of which both ends are open, the respective filter tubes are disposed approximately vertically, the dust containing gas flows downward in the filter tubes, and the flow area of the dust containing gas in the filtering chamber is small, it is preferable to make the flow velocity of the dust containing gas to the hopper at the bottom ends of the filter tubes, not less than 0.5 m/sec, more preferably approximately not less than 1 m/sec and not more than 2 m/sec.

In this case, when 2 through 15%, more preferably 3 through 10% of the dust containing gas normally introduced to the tubular type filtration apparatus, is blown down, it is possible to significantly reduce the thick accumulation of dusts on the filter tubes in the vicinity of the bottom ends of the filter tubes, and a sufficient blow down effect is provided which enables to avoid the thermal damage of the filter tubes. However, it is not preferable to extract too much dust containing gas from the hopper, since it dissipates much energy of the dust containing gas by the ejector.

In case of the tubular type filtration apparatus, the gas passages which communicate the hopper with the ejector, may be of a refractory alloy. However, it is preferable in case of the tubular type filtration apparatus, to compose portions of the gas passages which pass through the filtering chamber by filter tubes. this case, since 40 through 60% of the dust containing gas which is sucked from the hopper is filtered by the filter tubes and the filtered portion flows into the cleaned gas side space, the quantity of the dust containing gas sucked by the ejector can be reduced, and the suction quantity of the dust containing gas from the hopper can substantially be increased.

On the other hand, in case the candle type filtration apparatus or the crossed-flow type filtration apparatus, the flow area of the dust containing gas in the filtering chamber is relatively large. Therefore, it is necessary to extract much dust containing gas to provide the blow down effect. Further, it is necessary to increase the quantity of the dust containing gas which should be blown down preferably, to 10 through 25% of the quantity of the dust containing gas which is introduced into the filtration apparatus. However, according to the invented blow down means wherein the ejector utilizing a portion of energy of the dust containing gas introduced to the filtration apparatus is adopted, it is possible to return the dust containing gas having such a comparatively large quantity.

In another preferable PFBC boiler system of this invention, there is a means for returning the dusts trapped by the louver separator to the boiler. In the dusts emitted by the boiler are coarse, and 2 through 10% of unburnt ingredients and much of the dusts of coal or coke in an unburnt state are coarse and mainly trapped by the louver separator. In this construction, the unburnt ingredients can be effectively utilized as fuel, the fuel efficiency of the power plant is promoted, and the quantity of dusts to be deposited can be reduced.

Further, a considerable quantity of dolomite or limestone which is a desulfurization agent is contained in an unreacted state, in the coarse dusts. When these dusts are returned to the boiler, the use of the desulfurization agent can be saved. The PFBC boiler system of this construction, is especially suitable for promoting the fuel efficiency of a bubbling bed type PFBC boiler system having much emission of dusts containing unburnt ingredients.

As a means for returning dusts to the boiler, for instance, a construction can be adopted wherein a dust discharge port of the louver separator and a fluidized bed boiler are connected by a piping which stands high temperature and pressure, and the dusts are sent by a screw feeder or by compressed air. This structure is simple and is effective for providing reliability, since the possibility of failure is small compared with a normal treating system of dusts. In the construction wherein coarse dusts containing unburnt ingredients which have been trapped by the louver separator are sent to a boiler, the dust discharge pipe of the louver separator may further be extended downwardly, and the distal end of the dust discharge pipe is connected to a piping which is connected to the boiler.

Further, the total system can be constructed more compactly, the surface area whereby the heat energy of the hot dust containing gas is dissipated, can be reduced, and the installation cost of the system can be economized, by providing the louver separator and the gas passage in the pressure vessel which accommodates the filtration apparatus with ceramics filters.

When the ejector is disposed on the upstream side of the louver separator, and the filtration apparatus with ceramics filters is integrated with the louver separator, the nozzle of the ejector is eroded in a short time by particles of coarse dusts contained in the dust containing gas, and therefore, it is preferable to dispose the ejector on the downstream side of the louver separator.

This invention is preferably applicable to a circulating PFBC boiler system other than the bubbling bed type PFBC boiler system. In the former case, the cyclone separator for circulating fluidized ash may be replaced by the louver separator.

EXAMPLE

A specific explanation will be given of a PFBC boiler system of this invention by Examples. However, this invention is not restricted by these Examples.

FIG. 1 is a schematic diagram showing an example of a bubbling bed type PFBC boiler system according to the present invention, which is a portion of a power generating plant. In FIG. 1, a reference numeral 1 designates a filtration apparatus with ceramics filters which is accommodated in a pressure vessel together with a louver separator 24, 3, a filter tube the both ends of which are open, 6, a gas inlet chamber, 7, a hopper, 41, a dust discharge pipe of the louver separator 24, 90, a bubbling bed type PFBC boiler, 100, a pressure vessel which accommodates a main body of a boiler 101 and a bed material container 104, 110, a flue gas pipe, and 111, a piping for returning dusts trapped by the louver separator to the main body of the boiler 101.

In FIG. 1, hot dust containing flue gas emitted from the main body of the boiler 101, passes through the flue gas pipe 110 and flows into the louver separator 24 which is provided in the pressure vessel which accommodates the filtration apparatus 1 with ceramics filters 3. The dust containing gas which has flown downwardly into the louver separator 24, turns at louver vanes 26, and comparatively coarse dusts in the dust containing gas are separated by the inertia and the gravity and are sent to the dust discharge pipe.

When clearances between the louver vanes 26 are formed in a diffuser structure, the velocity of the dust containing gas which has flown between the louver vanes 26 decreases with an increase in the flow area and the gas recovers its static pressure, thereby enabling to restrain the pressure drop at the louver separator to a small value. In this case, the dust containing gas is uniformly distributed to the respective filter tubes 3, since the static pressure distribution of the dust containing gas which has flown into the gas inlet chamber 6 of the filtration apparatus 1 with ceramics filters 3, is uniform.

The dust containing gas distributed to the respective filter tubes 3, is filtered and sent to a downstream system of a plant from a cleaned gas outlet 12. The dusts are collected to the hopper 7 and deposited from a dust discharge port 42.

In this Example, the dusts containing much of comparatively coarse unburnt ingredients which have been trapped by the louver separator 24, are returned to the main body of the boiler 101 through the dust discharge pipe 41, the discharge port 40 and the piping 111, which is utilized as fuel. Accordingly, the fuel efficiency of the boiler is promoted and the quantity of dusts discharged from the plant is reduced. Further, limestone or dolomite which is a desulfurization agent, is often contained in the coarse dust in an unreacted state. Therefore, these components can be economized by returning the coarse dusts.

In the bubbling bed type PFBC boiler system, shown in FIG. 1, the dusts trapped by the louver separator may be employed as a bed material by returning them to the bed material container 104, and may be fed to the main body of a boiler 101 in accordance with the load. Further, when the system is provided with a construction wherein the dusts trapped both by the filtration apparatus 1 with ceramics filters 3 and the louver separator 24, are returned to the main body of the boiler 101, the deposit treatment of the dusts or the ash can be performed only at the lower portion of the main body of the boiler 101, and therefore, the operation of the PFBC boiler system is simplified.

Figure 2:
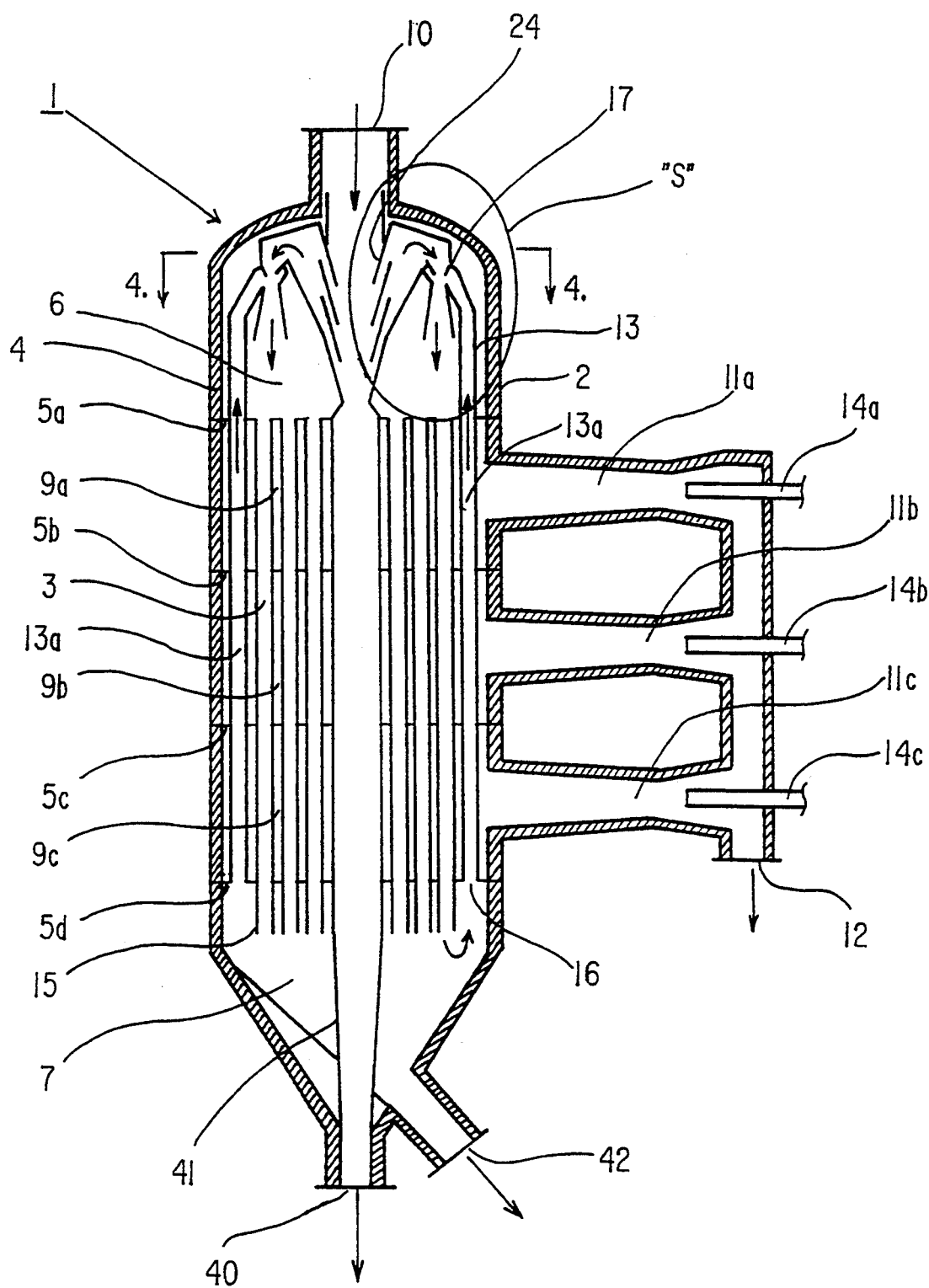
FIG. 2 is a longitudinal sectional diagram showing another example of a filtration apparatus with ceramics filters which is employed in a PFBC boiler system according to the present invention.
Figure 3:
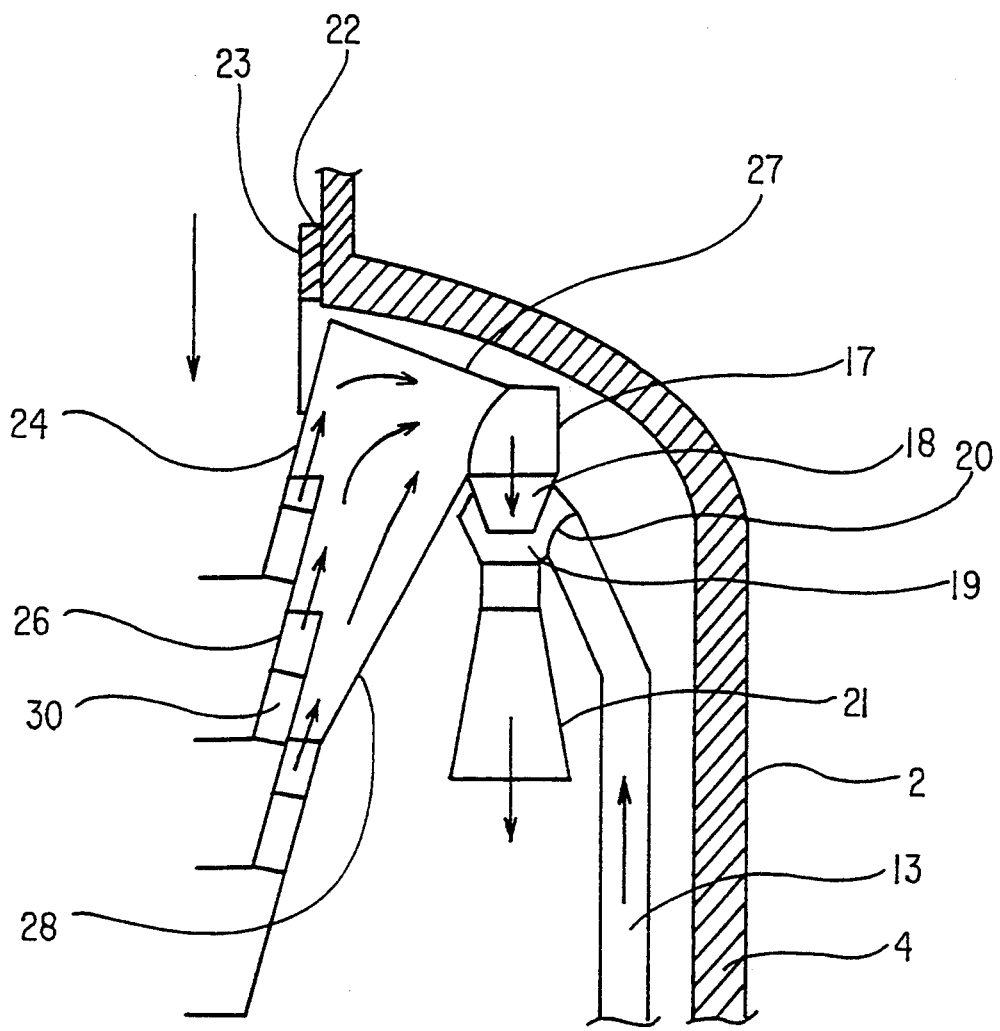
FIG. 3 is a magnified sectional diagram of "S" portion of FIG. 2.

FIG. 2 is a longitudinal sectional diagram showing an example of another filtration apparatus with ceramics filters which is integrated into a PFBC boiler system of this invention. In FIG. 2, a louver separator 24 and a blow down means composed of an ejector 17 and a gas passage 13, is accommodated in a pressure vessel 2 which also accommodates the filtration apparatus 1 with ceramics filters 3, and a nozzle 18 (see FIG. 3) of the ejector 24 is disposed on the downstream side of the louver separator 24. Further, FIG. 3 is a magnified sectional diagram of the ejector portion ("S" portion) of FIG. 2, and FIG. 4, a sectional diagram taken along the line A—A of FIG. 2.

In these diagrams, a reference numeral 4 designates a thermal insulation provided on the inner side of the pressure vessel, 5a, 5b, 5c and 5d, tube sheets respectively supporting the filter tubes 3 and horizontally partitioning the inside of the pressure vessel 2, 9a, 9b and 9c, respectively, top, middle and bottom cleaned gas chamber (a space including the filter tubes 3 and the cleaned gas chambers 9a, 9b and 9c, is a filtering chamber), 10, a gas inlet port, 40, a dust discharge port of a dust discharge pipe 41, and 42, a dust discharge port of a hopper 7.

Further, notations 11a, 11b and 11c designate cleaned gas outlet pipes which are also employed as parts of ejectors for blowing gas of back-washing respectively into the top, middle and bottom cleaned gas chambers 9a, 9b and 9c, 14a, 14b and 14c, discharge nozzles for injecting compressed gas (preferably compressed air) to the respective cleaned gas outlet pipes 11a, 11b and 11c, 15, skirts installed at the bottom ends of the filter tubes 3, 16, a suction port of the gas passage 13 which is opened to the hopper 7, 17, the ejector composed of a nozzle 18 and a diffuser 21, 27 and 28, partitions for guiding the gas flown out of the louver separator 24 to the ejector 17, 26, a louver vane, and 30, a guide vane provided between the louver vanes 26.

Further, a reference numeral 19 designates an inlet portion of the diffuser 21, and 20, a suction port sucking the dust containing gas from the hopper 7 through the gas passage 13. The dust containing gas flowing from the louver vanes 26, much of which dusts have been removed, is accelerated at the nozzle 18 of the ejector 17 forming a low static pressure, sucks the dust containing gas of the hopper 7, from the suction port 20 provided at the inlet portion 19 of the diffuser 21 of which diameter is most constricted and wherein the static pressure of the gas is low, and the static pressure of gas recovers to the original value by the diffuser 21 by converting the flow velocity to the static pressure.

Figure 4:
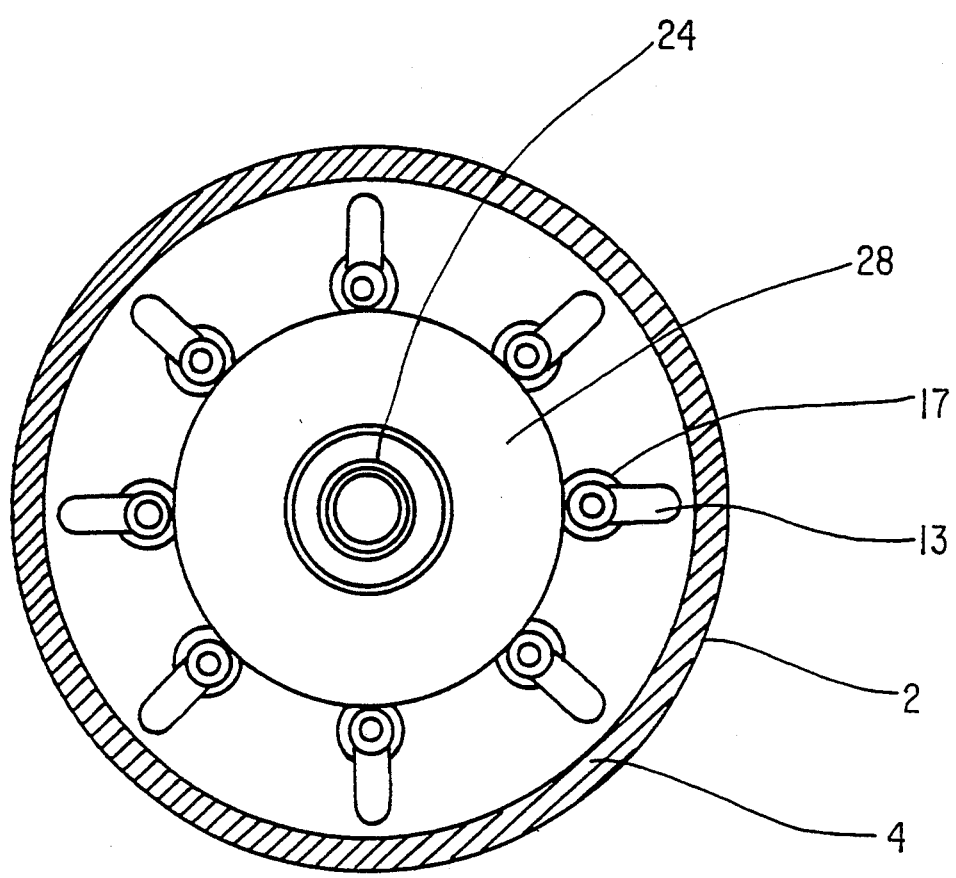
FIG. 4 is a sectional diagram taken along the line A—A of FIG. 2.

As shown in FIG. 4, in this example, eight routes of the gas passages 13 are provided, and the ejectors 17 are provided to the respective gas passages. Accordingly, the dust containing gas is evenly sucked from the eight suction ports 16 opened in the hopper 7. Therefore, the down flow of the dust containing gas is maintained in the respective filter tubes 3, and the fluctuation of the flow velocity of the dust containing gas flowing out from the bottom ends of the respective filter tubes 3 is small.

When a static pressure difference of 300 through 1000 mmWC (or Aq) is provided between the inlet portion 19 of the diffuser 21 and an outlet portion thereof, it is possible to return 7 through 15% of the dust containing gas introduced to the tubular type filtration apparatus. It is easy to provide a sufficient blow down effect in the tubular type filtration apparatus, since it is easy to recover the static pressure of approximately 1000 mmWC in the diffuser 21 and the flow area in the filtering chamber is small.

When the down flow of the dust containing gas is provided in all the bottom ends of the filter tubes 3 by the blow down effect, it is possible to prevent a phenomenon wherein the dusts are accumulated abnormally thick in the vicinity of the lower ends of the respective filter tube 3, or the accumulated dusts containing unburnt ingredients are ignited and combusted, and a stable and high filtering capacity can be maintained.

In this example, filter tubes are employed at gas passages 13a which are portions of the gas passages 13 passing the filtering chambers. An austenetic heat resisting alloy added with a rare earth element such as cerium is employed as materials of the portion of the gas passages 13 other than the portions 13a, the louver vanes 26 and the like. However, a cordierite ceramics, a silicon carbide ceramics or a silicon nitride ceramics can be employed. The gas passages 13 composed of the heat resisting alloy are employed as props supporting the ejectors 17 and the louver separator 24.

Further, to cope with the displacement caused by a difference in thermal expansions among the gas passages 13 composed of heat resisting alloy tubes, the pressure vessel 2 and the like, the gas inlet port 10 is connected to the louver separator 24 such that the displacement is absorbed through a guide sleeve 23 and a labyrinth seal 22.

In this example, since the portions of the gas passages 13 passing through the filtering chambers are the filter tubes 13a, the filtering of the dust containing gas is also performed at the gas passages 13a. Accordingly, even if the quantity of the dust containing gas sucked to the ejectors is small, the quantity of the dust containing gas sucked to the suction ports 16 at the bottom ends of the gas passages 13 is large. Therefore, the quantity of the dust containing gas flowing into the hopper 7 from the filter tubes 3 is large, and accordingly, a flow quantity necessary for providing the blow down effect can easily be procured. Further, the tubular type filtration apparatus can be constructed more compactly while maintaining the same capacity, since the filtering function is also provided to the portions of the gas passages 13a.

In this construction, the pressure drop of gas at the ejector can be reduced since it is not necessary to provide a large static pressure difference by considerably constricting the nozzles 18. Further, the erosion of the nozzles 18 by the dusts is alleviated, since the flow velocity of gas at the constricted portion of the nozzles 18 is not so large.

In case of introducing the dust containing gas emitted from the PFBC boiler directly to the louver separator 24, although depending on the kind of the PFBC boiler, when the pressure drop at the louver separator 24 is 700 mmWC, for instance, a filtering efficiency of 75 through 85% can be provided.

In the apparatus of this construction, the dust containing gas which has flown to the gas inlet chamber 6 of the tubular type filtration apparatus 1 through the louver separator 24 and the ejector 17, is distributed to the respective filter tubes 3, filtered on the inner surfaces of the respective filter tubes 3, and a filtered gas thereof flows into the cleaned gas chambers 9a, 9b and 9c as the cleaned gas. The cleaned gas collected in the respective gas chambers is transferred to a downstream system of the plant from the cleaned gas outlet 12 through the corresponding cleaned gas outlet pipes 11a, 11b and 11c.

The dust containing gas having a quantity corresponding to the quantity of the dust containing gas extracted from the hopper 7 by the blow down means, flows into the hopper 7, from the bottom ends of the skirts 15 installed at the bottom ends of the respective filter tubes 3. When the static pressure distribution in the gas inlet chamber 6 is uniform and there is no variation in the gas permeability of the respective filter tube, the dust containing gas flows out from the bottom ends of the respective filter tubes 3 at the same flow velocity.

However, there is a variation among the quantities of the dust containing gas flowing into the respective filter tubes 3, and a disordered flow of the dust containing gas is caused in the hopper 7. Therefore, the skirts 15 are provided such that the dust containing gas which contains much dusts, and which has flown out from the filter tubes 3 is not sucked directly to the suction ports 16 of the gas passages 13. It is preferable that the length of the skirt 15 is rendered long in a range wherein the gas flow does not float up the dusts accumulated in the hopper.

Considering the flow of the dust containing gas in the hopper 7, the vertical distance between the distal end of the skirt 15 and the suction port 16 of the gas passage 13, is preferably not less than 100 mm, more preferably not less than 200 mm.

When the dusts in the dust containing gas are accumulated thickly on the inner surfaces of the respective filter tubes 3, the pressure difference between the gas inlet chamber 6 and the cleaned gas chambers 9a, 9b and 9c increases, and the filtering capacity of the tubular type filtration apparatus 1 is reduced. The built-up dusts are removed by blowing a back-washing gas successively to the respective cleaned gas chambers 9a, 9b and 9c automatically at pertinent time intervals, thereby regenerating by back-washing the respective filter tubes 3 in the corresponding cleaned gas chambers. The removed dusts are collected to the hopper by the gravity and by the flow of the dust containing gas, and the operation of the tubular type filtration apparatus continues while maintaining the pressure drop of the filter tube at a low value.

This back-washing is performed by opening and closing quick operating control valves, not shown, connected to the back-washing nozzles 14a, 14b and 14c, alternately discharging compressed gas (preferably compressed air; a process gas, steam and the like are usable) from the respective back-washing nozzles, and by permeating the back-washing gas from the outside of the filter tube toward the inside thereof by enhancing the pressure in the corresponding cleaned gas chamber higher than the pressure on the dust containing gas side, thereby separating the dusts accumulated on the filter tubes 3. The valve opening time period of the control valve, is determined to be preferably 0.1 through 0.5 second (a time period required from a fully-closed state to a fully-opened state and finally to the fully-closed state).

To effectively perform the back-washing, the time required from the fully-closed state to the fully-opened state, and the hold time of the fully-opened state are important. When the time required from the fully-closed state to the fully-opened state is long, the pressure difference between the inside and the outside of the filter tube (hereinafter, pressure difference for back-washing) can not sufficiently be made large. Further, when the hold time in the fully-opened state is too short, the rise of the pressure difference for back-washing is insufficient, and the regeneration of the filter tubes will be incomplete.

When the regeneration by the back-washing is insufficient, the pressure drop of the filter tubes gradually increases, the filtration capacity of the filtration apparatus with ceramics filters gradually decreases. The back-washing condition is selected with an optimum by the type and size of the control valve, the pressure of compressed air, the size of the piping of compressed air, the effective filtration area of the filter tube on which the back-washing is performed, and a dead volume (volume of cleaned gas chamber) outside of the filter tube.

The blowing of the back-washing gas to the respective cleaned gas chambers 9a, 9b and 9c, may be performed, for instance, in the order of the cleaned gas chambers 9a, 9b and 9c respectively for a duration of time of not larger than 60 seconds, at every 15 minutes, or may be performed in the order of cleaned gas chambers 9a, 9b and 9c at every 5 minutes. The dusts separated from the filter tubes 3, by the back-washing, are swiftly transferred to the hopper by the gravity and by the down flow of the dust containing gas flowing in the filter tubes 3, which is provided by returning the dust containing gas such that the dusts do not build up on the inner surfaces of the filter tubes 3 again.

Figure 5:
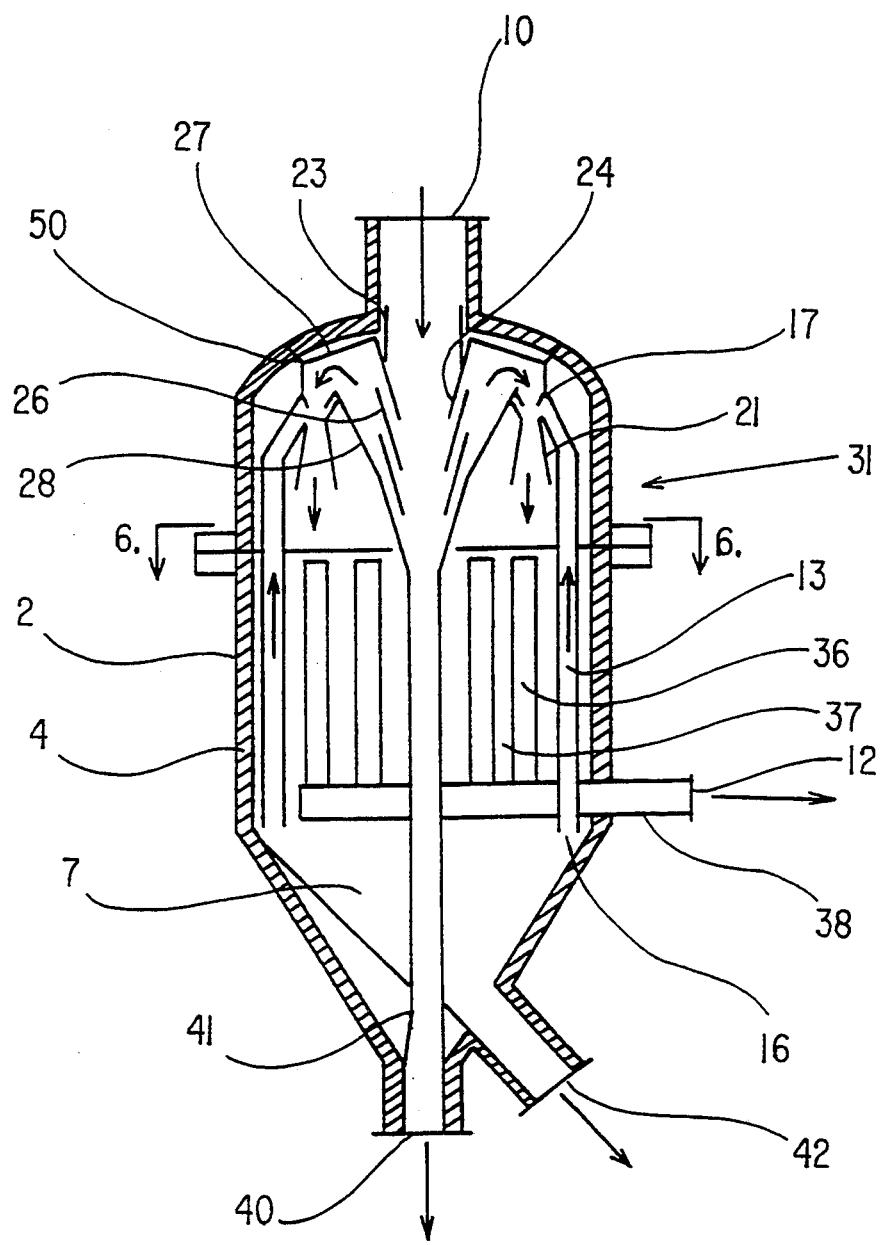
FIG. 5 is a longitudinal sectional diagram showing another example of a filtration apparatus with ceramics filters 3 which is employed in a PFBC boiler system according to the present invention.
Figure 6:
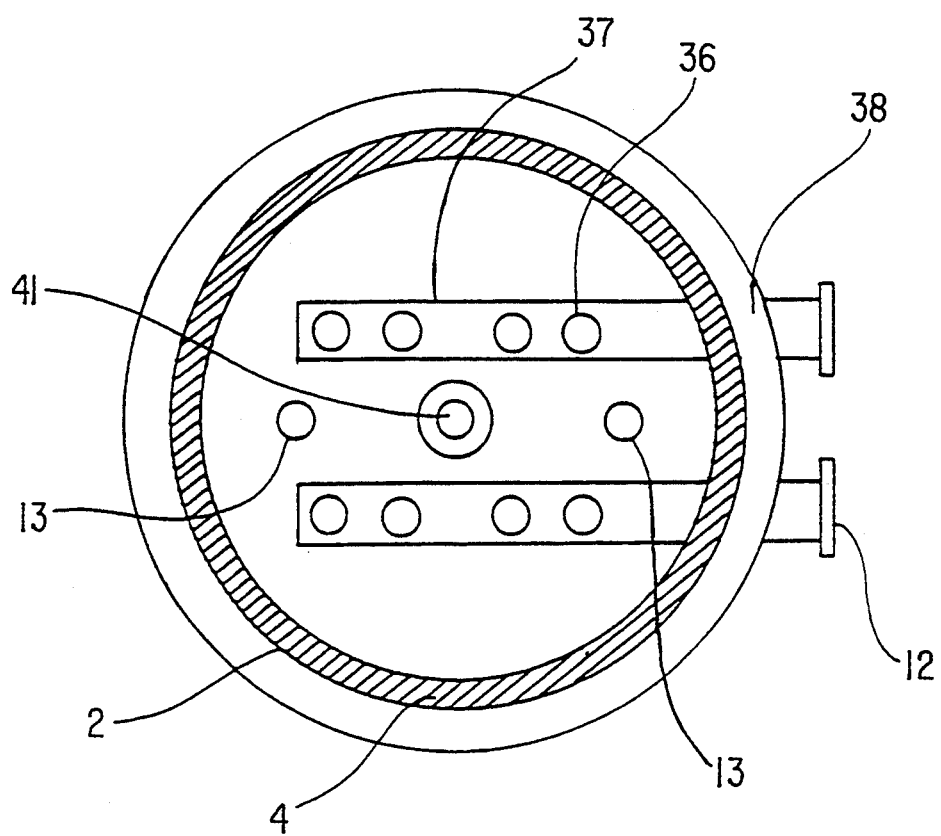
FIG. 6 is a sectional diagram taking along the line B—B of FIG. 5.

FIG. 5 is a longitudinal sectional diagram showing another example of a filtration apparatus with a ceramics filters which is integrated into the PFBC boiler system of this invention. In FIG. 5, a candle type filtration apparatus 31 is adopted as the filtration apparatus with ceramics filters, and the louver separator 24 and the ejector 17 are integrated to the candle type filtration apparatus 31. FIG. 6 is a sectional diagram taken along the line B—B of FIG. 5. Although a PFBC boiler on the upstream side thereof is not shown in FIG. 5, there is no cyclone separator on the upstream side.

In FIGS. 5 and 6, a reference numeral 36 designates a filter tube of which one end is closed, 37, a filtration unit wherein a plurality of filter tubes 36 are installed approximately vertically on top of a cleaned gas header 38, and 50, a hanger which hangs the ejectors 17, the louver separator 24, the dust discharge pipe 41 and the gas passages 13. The portion having the same function as in the portion already explained in the former example, is attached with the same reference numeral as in the former example, and the explanation will be omitted (the same infra).

The structure of the louver separator integrated with this candle type filtration apparatus 31 is substantially the same with that shown in FIG. 3. In the candle type filtration apparatus, the dust containing gas flows outside of the filter tubes 36 and is filtered by the filter tubes 36, a portion thereof enters the inside of the filter tube 36 to be a cleaned gas, and is collected to the cleaned gas headers 38. As shown in FIG. 6, in this example, two pieces of filtration units 37 are arranged in the horizontal direction, and the cleaned gas is transferred to the downstream of the plant through the cleaned gas outlet 12 contiguous to the cleaned gas header 38.

Further, as in the Example 1, also in this example, the flue gas containing dusts passes through the gas inlet port 10 and the guide sleeve 23, flows into the louver separator 24, and turns the direction thereof at the louver vanes 26. Comparatively coarse dusts containing much of unburnt ingredients in the gas are separated by the inertia or by the gravity after impinging on the louver vanes 26, and most of the separated dusts are transferred to the dust discharge pipe 41.

In case wherein the dust containing gas emitted from the main body of the boiler is directly introduced into the louver separator 24, when, for instance, the pressure drop at the louver separator 24 is 700 mmWC, a dust separating efficiency of 75 through 85% is provided. Therefore, the residual 15 through 25% of dusts are to be filtered by the candle type filtration apparatus.

The dust containing gas wherein 75 through 85% of dusts have been removed, passes through the louver vanes 26, is transferred to the ejectors 17 (there are two ejectors as shown in FIG. 6), and is accelerated by the nozzle of each ejector 17 thereby forming the low static pressure at the inlet of the diffuser 21. The dust containing gas at the hopper 7 is sucked from the suction port of the gas passage 13 which is opened to the portion of the low static pressure.

The dust separating efficiency of the louver separator is maintained even when the PFBC boiler is in a transient state and a large amount of dusts containing unburnt ingredients are emitted from the main body of the boiler. Therefore, the quantity of dusts to be filtered at the candle type filtration apparatus can be maintained below the filtering capacity of the candle type filtration apparatus 31. Since the ratio of the unburnt ingredients contained in the dust containing gas flown out by the louver separator is small, the dusts accumulated on the filter tubes 36 are difficult to combust, and do not combust violently. Therefore, the filter tubes 36 are difficult to receive the thermal damage.

In the diffuser 21 of the ejector 17, the dynamic pressure of the accelerated dust containing gas is converted into the static pressure again, and the static pressure increases, for instance, by 1000 mmWC. The dust containing gas flows into the filtering chamber of the candle type filtration apparatus 31 and is filtered by the filter tubes 36. The pressure difference of the dust containing gas is employed as a driving force for sucking a portion of the dust containing gas from the hopper 7 through the suction port 16 and the gas passage 13.

The pressure difference of 1000 mmWC is sufficiently large to provide the blow down effect, even in the candle type filtration apparatus wherein the returning quantity of the dust containing gas which is necessary to provide the blow down effect, is larger than that of the tubular type filtration apparatus. Accordingly, even in the construction wherein the candle type filtration apparatus is adopted in this invention, the blow down means by the ejector and the gas passage is useful.

In the candle type filtration apparatus 31 which is provided with the blow down means employing the ejector, the downward dust containing gas flow is always provided in the vicinity of the filter tubes 36, and there is no portion in the filtering chamber where the dust containing gas flow is stagnant. Therefore, the dusts separated from the filter tubes 36 by the back-washing are swiftly transferred to the hopper 7 by the downward dust containing gas flow and the gravity, and do not accumulate thickly on the filter tubes 36.

The regeneration by back-washing of the candle type filtration apparatus 31 is performed with respect to each filtration unit 37 as in the example of FIG. 2, and a detailed explanation will be omitted.

In this way, even in the PFBC boiler system integrated with the candle type filtration apparatus 31, a stable filtering function can be achieved by replacing the cyclone separator on the upstream side by the louver separator 24. Even in a transient state wherein the dusts containing unburnt ingredients are emitted in a large amount from the main body of the boiler, the filtration can be continued with no trouble. The installation cost is economized by reducing the volume of the pressure vessel by a portion whereby the cyclone separator is omitted.

In the example shown in FIGS. 5 and 6, the top end of each filter tube 36 is closed and the bottom end thereof is retained to the cleaned gas header 38. However, there is a candle type filtration apparatus wherein the bottom end of each filter tube 36 is closed and the top end thereof is retained by the cleaned gas header 38. The PFBC boiler system of this invention may adopt the candle type filtration apparatus wherein each filter tube 36 is inversely arranged.

Figure 7:
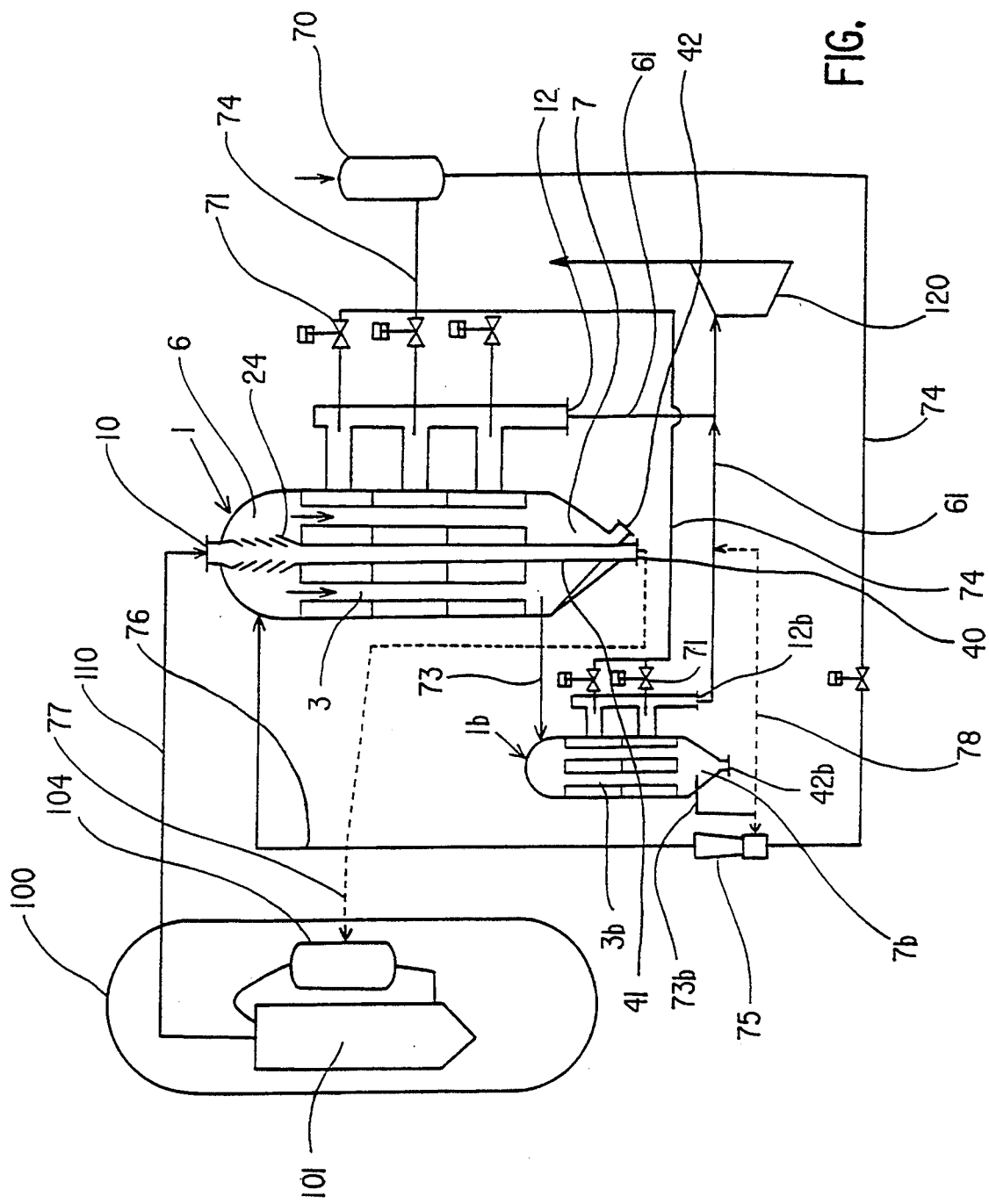
FIG. 7 is a schematic diagram showing the outline of a power generation plant according to another example of a PFBC boiler system according to the present invention.

FIG. 7 is a schematic diagram showing another example of a power generation plant by a PFBC boiler system according to the present invention. Since no cyclone separator is provided on the upstream side of the filtration apparatus 1 with ceramics filters 3, the diameter and the inner volume of the pressure vessel 100 are reduced by a portion of the cyclone separator. Further, as a blow down means, a gas extracting pipe 73 which is open to the dust collecting hopper 7 in the filtration apparatus 1 with ceramics filters 3, and another filtration apparatus 1b with ceramics filters 3b having a small capacity which is connected to the gas extracting pipe 73 are adopted.

In the example of FIG. 7, both the filtration apparatus 1 with ceramics filters 3 and the filtration apparatus 1b with ceramics filters 3b are tubular type filtration apparatus. The hot dust containing flue gas emitted from the main body of the boiler 101, passes through the flue gas pipe 110, and flows into the louver separator 24 integrated in the pressure vessel which accommodates the tubular type filtration apparatus 1.

Most of the dust containing gas wherein most of the dusts have been separated by the louver separator 24, is further filtered by the tubular type filtration apparatus 1, and is converted to a cleaned gas and is transferred to the downstream system of the plant having the gas turbine 120 from the cleaned gas outlet 12 through a piping 61.

A portion, for instance, 9% of the dust containing gas is extracted from the gas extracting pipe 73 which is connected to the hopper 7 of the tubular type filtration apparatus 1, transferred to the tubular type filtration apparatus 1b having a small capacity, and filtered thereby, and a major portion thereof is converted to cleaned gas which is transferred to the gas turbine 120 from a cleaned gas outlet 12b similarly through the piping 61.

Most of the dusts trapped by the louver separator 24 are deposited to the outside of the system from the dust discharge port 40 through the dust discharge pipe 41. When much of unburnt ingredient is contained in the deposited dusts, it is preferable to enhance the fuel efficiency by sending the dusts to the bed material container 104 or the main body of the boiler 101 for recombustion, by a piping 77.

Further, the dusts accumulated on the filter tubes 3 of the tubular type filtration apparatus 1 are removed from the filter tubes 3 by the back-washing, collected to the hopper 7 by the flow of the dust containing gas through the blow down and by the gravity, and are deposited outside of the system from the dust discharge port 42. A reference numeral 70 in FIG. 7 designates a tank of compressed air, 71, a control valve of compressed air employed in the back-washing, and 74, a piping of compressed air.

When 9% of the dust containing gas which has flown to each tubular type filtration apparatus 1, 1b from each hopper 7, 7b, is extracted to provide the blow down effect, the quantity of extracted gas from the hopper 7b is 0.81% of the gas which has flown to the tubular type filtration apparatus 1.

The dusts which have been trapped by the filter tubes 3b in the tubular type filtration apparatus 1b and collected to the hopper 7b, are deposited outside of the system from a dust discharge port 42b. The dust containing gas extracted from the hopper 7b by a gas extracting pipe 73b, is transferred to an air ejector 75, and pressurized by compressed air supplied from the compressed air piping 74, and is transferred to the gas inlet chamber 6 of the tubular type filtration apparatus by a piping 76.

When the quantity of dusts contained in the dust containing gas extracted from the gas extracting pipe 73b is small, it is also possible to join the dust containing gas to the piping 61 by a piping 78, and is employed for power generation by sending it to the gas turbine 120.

Also in the PFBC boiler system of this invention, as in the examples shown in FIGS. 2 and 5, the system can stably be operated without trouble such as the thermal damage of the filter tubes, even when the PFBC boiler is in a transient state and a dust containing gas including a large amount of dusts containing unburnt ingredients is transferred to the gas inlet port 10 of the tubular type filtration apparatus 1, and the installation cost of the system can also be economized.

Figure 8:
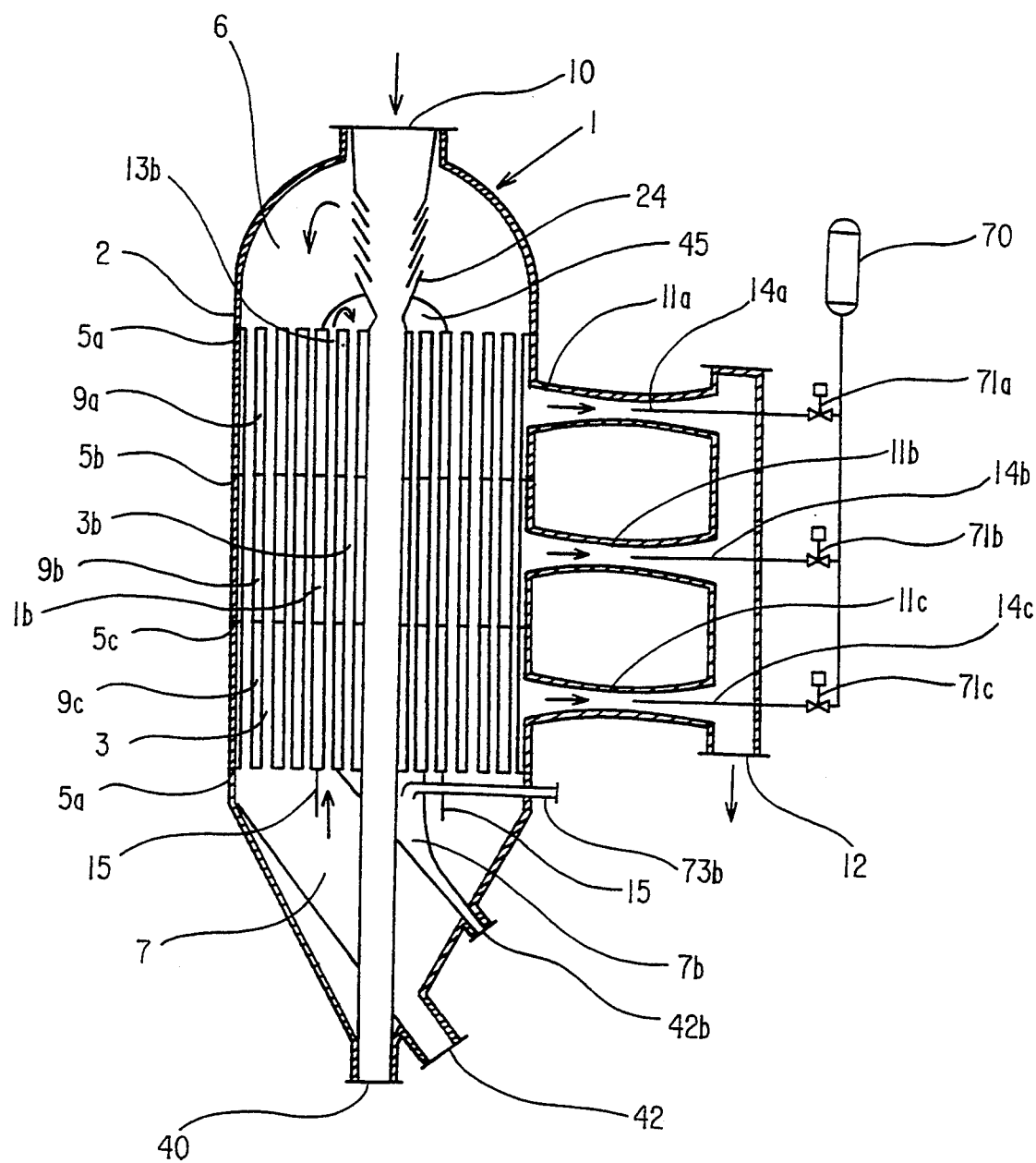
FIG. 8 is a longitudinal sectional diagram showing another example of a filtration apparatus with ceramics filters which is employed in a PFBC boiler system according to the present invention.
Figure 9:
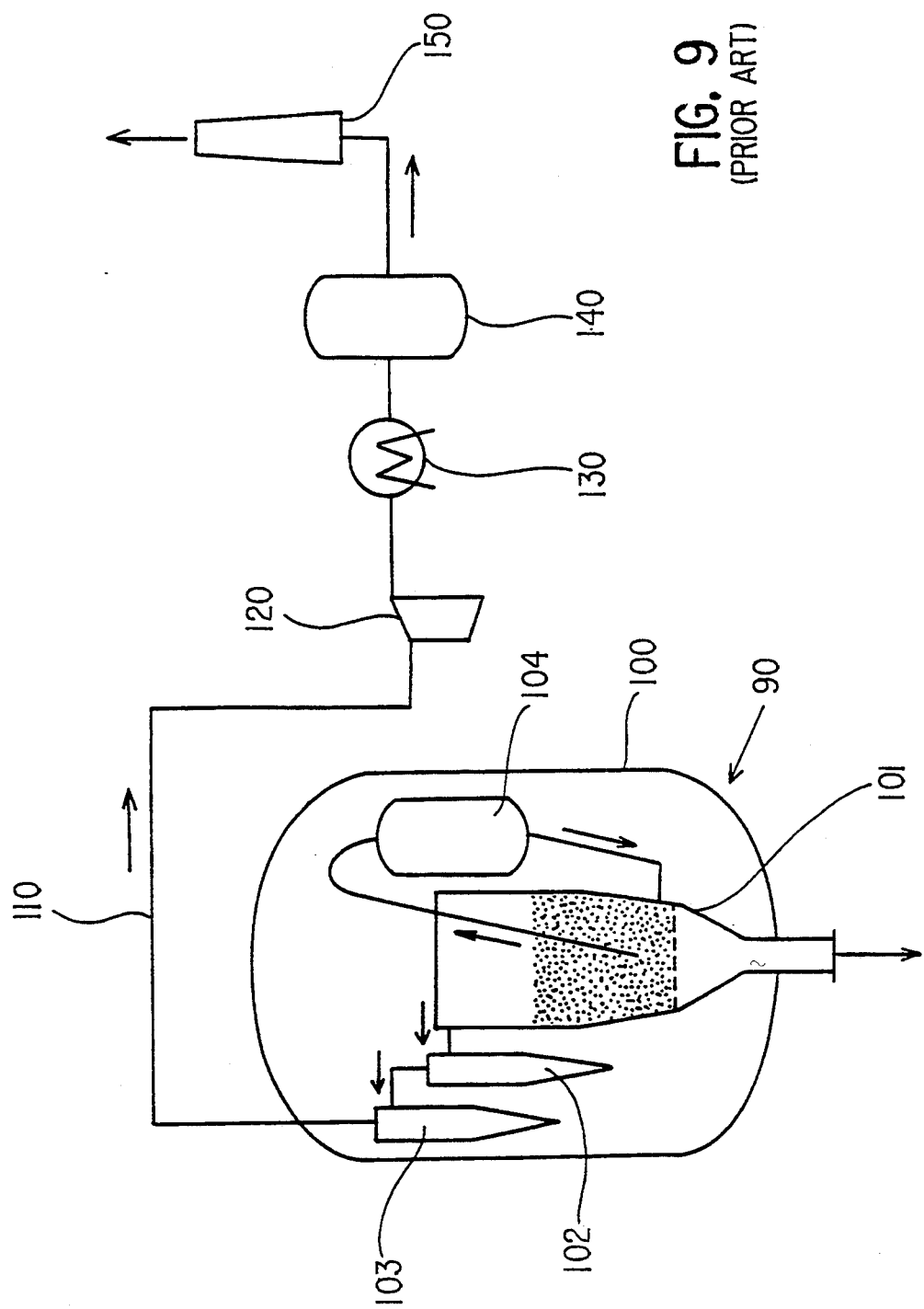
FIG. 9 is a schematic diagram showing an example of a power generation plant according to a conventional PFBC boiler system.
Figure 10:
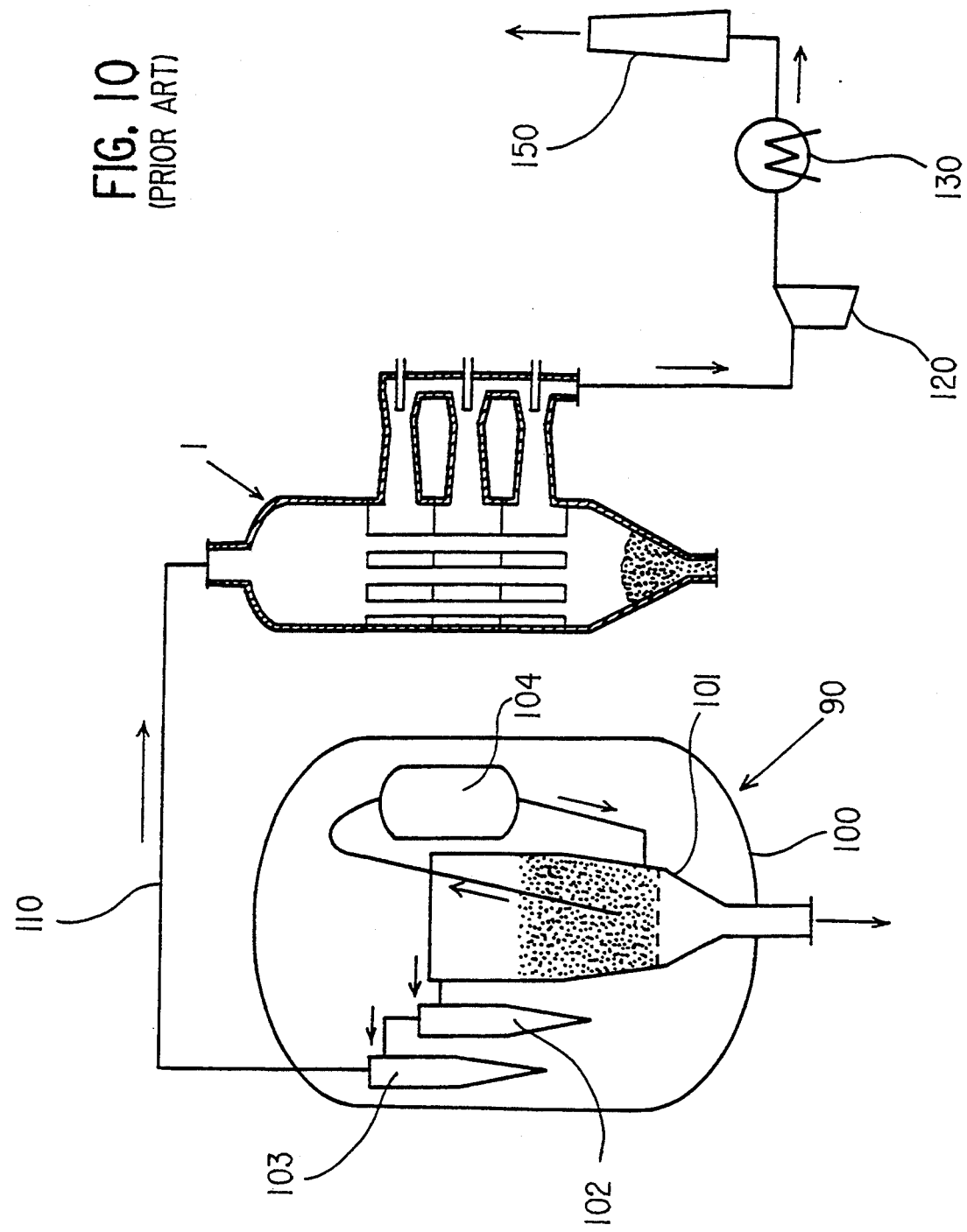
FIG. 10 is a schematic diagram showing another example of a power generation plant of a conventional PFBC boiler system.

FIG. 8 is a longitudinal sectional diagram showing another example of a filtration apparatus with ceramics filters which is integrated to a PFBC boiler system according to the present invention. A tubular type filtration apparatus is adopted as the filtration apparatus 1 with ceramics filters 3. A louver separator 24 and a filtration apparatus 1b with ceramics filters 3b having a small capacity are accommodated in a same pressure vessel 2.

In the tubular type filtration apparatus of this example, portions of the filter tubes 3 are employed as filter tubes 3b of the tubular type filtration apparatus 1b having a small capacity. The hot dust containing gas which has been emitted from a PFBC boiler, not shown, is introduced into the gas inlet port 10 as in the example of FIG. 1, and first, flows into the louver separator 24.

The dust containing gas wherein much of the dusts have been separated in the louver separator 24, flows into the gas inlet chamber 6, and is distributed to the filter tubes 3. Most of the dust containing gas is converted to the cleaned gas and is collected to the cleaned gas chambers 9a, 9b and 9c, and is sent to the downstream system (not shown) of the plant wherein a gas turbine is provided, from the cleaned gas outlet 12 through the corresponding cleaned gas outlet pipes 11a, 11b and 11c.

A portion of the dust containing gas which has flown to the hopper 7 from the skirts 15 which are installed at the bottom ends of the filter tubes 3, for instance, 7% of dust containing gas which has been introduced from the gas inlet port 10, is sucked through rising pipes 13b which are provided in the filtering chamber in parallel with the filter tubes 3, goes up in the filtering chamber, the direction thereof is turned to the downward direction in a turning chamber 45, flows into filter tubes 3b of the filtration apparatus 1b having a small capacity, and is filtered. Most of the dust containing gas is converted to the cleaned gas which enters the cleaned gas chambers 9a, 9b and 9c and joins the cleaned gas which has been filtered by the filter tubes 3.

In this example, the rising pipes 13b are made of a refractory metal. However, when filter tubes are employed as the rising pipes 13b, the filtration of the dust containing gas is performed also at this portion, and the tubular type filtration apparatus can be constructed more compactly. A hopper 7b is provided at the bottom ends of the filter tubes 3b which is partitioned from the hopper 7, and which is attached with a discharge port 42b for depositing the collected dusts, and a gas extracting pipe 73b for extracting the dust containing gas from the hopper 7b.

The dust containing gas extracted from the gas extracting pipe 73b, may be treated, for instance, as in the example of FIG. 7. It is preferable that the dusts which have been separated by the louver separator 24 and which are comparatively coarse and contain much unburnt ingredients, are returned to the main body of the boiler or the bed material container from the dust discharge port 40, thereby economizing fuel and the like and reducing the quantity of dust to be deposited.

The dusts accumulated on the surfaces of the filter tubes 3 and 3b are removed from the surfaces of the filter tubes 3 and 3b, by successively performing the back-washing with respect to each of the cleaned gas chambers 9a, 9b and 9c at time intervals which are automatically set by a control device, not shown, and the filtering capacity of the filtration apparatus is provided by maintaining the pressure loss of the filter tubes 3 and 3b below a low value. Further, the removed dusts are collected to the hoppers 7 and 7b by the gravity and by the gas flow.

In this example, the regeneration by back-washing of the tubular type filtration apparatus 1 and 1b is performed with respect to the filter tubes 3 and 3b simultaneously and with no discrimination, by injecting compressed air stored in the tank 70 for compressed air from the back-washing nozzles 14a, 14b and 14c, by successively opening control valves 71a, 71b and 71c for short periods. Therefore, the number of the control valves of compressed gas necessary for the back-washing can be reduced, and the back-washing system including the control device can be simplified.

According to this example, even when the dust containing gas containing a large amount of dusts including unburnt ingredients is introduced, the thermal damage of the filter tubes 3 and 3b can be avoided, the number and the volume of the necessary pressure vessels can be reduced, the total length of the pipings between the both tubular type filtration apparatus can be made short, and therefore, the thermal energy dissipated from the surfaces of the pressure vessel and the piping can be reduced and the installation cost can be reduced.

According to the power generation plant integrated with the PFBC boiler system of this invention and a gas turbine, even when the dust containing gas containing a large amount of dusts including unburnt ingredients is transiently emitted from the PFBC boiler, and reaches the filtration apparatus with ceramics filters, the louver separator functions without overflowing the dusts, as in the cyclone separator, and the dusts which contain much of the unburnt ingredients are separated with priority.

Accordingly, the dust concentration of the dust containing gas flowing into the filtration apparatus with ceramics filters does not increase extremely. Since the dusts trapped by the ceramics filters are difficult to combust, the dusts accumulated on the ceramics filters are difficult to combust, and no violent combustion is caused even when they combust, and therefore, no serious trouble is caused to the plant by the thermal damage of the ceramics filters.

Further, since the installation of the cyclone separator is omitted, it is not necessary to provide a large space which is necessary for accommodating the cyclone separator in the pressure vessel, and therefore, it is possible to reduce the outer diameter and the inner volume of the pressure vessel, the expenditure which is economized thereby is significantly large, and the installation cost of the power generation plant can be inexpensive by that portion.

Further, the quantity of dusts accumulated on the ceramics filters can be reduced by providing the blow down means preferably composed of the ejector and the gas passage. Therefore, the high filtering capacity of the filtration apparatus with ceramics filters can be maintained, and a danger wherein the accumulated dusts containing unburnt ingredients are ignited and combusted thereby causing the thermal damage of the ceramics filters, can surely be avoided, and the reliability of the PFBC boiler system is further promoted.

Especially, in the construction wherein the ejector and the gas passage are employed as the blow down means, the filtration apparatus with ceramics filters is the tubular type filtration apparatus, and the dust containing gas extracted from the hopper is returned to the vicinity of the gas inlet port of the tubular type filtration apparatus, the pressure vessel of the PFBC boiler system can further be made compact, the total length of pipings can be shortened. Therefore, the quantity of thermal energy dissipation from the surface of the apparatus composing the system and the installation cost of the system can further be reduced.

Further, the fuel efficiency can be promoted and the quantity of dusts to be deposited can be reduced by returning the dusts containing much amount of unburnt ingredients which have been trapped by the louver separator, to the PFBC and by combusting them. Accordingly, it is expected that the realization of the new coal utilization technology of which installation cost is inexpensive and which is excellent in view of the environmental protection and energy efficiency can be accelerated, and the value of its utilization in the energy industry is great.

What is claimed is:

1. A pressurized fluidized bed combustion boiler system comprising:
   a boiler;
   a filtration apparatus with ceramics filters in a flue gas system and
   a louver separator as a primary stage dust separator disposed between said boiler and said filtration apparatus with ceramics filters.

2. The pressurized fluidized bed combustion boiler system according to claim 1, wherein a blow down means is provided to the filtration apparatus with ceramics filters for extracting a portion of a dust containing gas from a dust collecting hopper in the filtration apparatus.

3. The pressurized fluidized bed combustion boiler system according to claim 1, wherein a means is provided in the pressurized fluidized bed combustion boiler system for returning dusts trapped by the louver separator to the boiler.

4. The pressurized fluidized bed combustion boiler system according to claim 1, wherein the filtration system with ceramics filters and the louver separator are accommodated in a single pressure vessel.

5. The pressurized fluidized bed combustion boiler system according to claim 2, wherein the blow down means for extracting a portion of a dust containing gas from a dust collecting hopper in the filtration apparatus with ceramics filters comprises an ejector and a gas passage, a portion of energy of said dust containing gas introduced into the filtration apparatus is utilized by said ejector and said portion of a dust containing gas from said dust collecting hopper is sucked from a first end of said gas passage connected to the ejector and returned to a location proximate to a gas inlet port of the filtration apparatus from a second end of the gas passage.

6. The pressurized fluidized bed combustion boiler system according to claim 5, wherein the louver separator, the ejector and the gas passage are accommodated in a single pressure vessel for the filtration apparatus with ceramics filters.

7. The pressurized fluidized bed combustion boiler system according to claim 5 or claim 6, wherein an outer configuration of the louver separator is formed in an approximately conical shape, diffusers are formed between respective vanes of the louver separator, said vanes of the louver separator are penetrated and supported by a plurality of pipes which are employed as the gas passages, and suction ports of the dust containing gas are formed on surfaces of said plurality of pipes at portions thereof between the respective vanes of the louver separator wherein flow passages of gas are narrowed by the plurality of pipes thereby forming ejectors.

8. The pressurized fluidized bed combustion boiler system according to claim 2, wherein the blow down means comprises a gas extracting pipe which is open to the dust collecting hopper in the filtration apparatus with ceramics filters and a second filtration apparatus with ceramics filters having a small capacity that is connected to said gas extracting pipe.

9. The pressurized fluidized bed combustion boiler system according to claim 1, wherein a flow of a dust containing gas in the louver separator is an approximately vertical downward flow.

10. The pressurized fluidized bed combustion boiler system according to claim 1, wherein the ceramics filters of the filtration apparatus are filter tubes which are open at both ends thereof, each filter tube is installed approximately vertically and a dust containing gas flows in a downward direction in said filter tubes.

11. The pressurized fluidized bed combustion boiler system according to claim 1, wherein the ceramics filters of the filtration apparatus are filter tubes which are closed at one-side ends thereof, each filter tube is connected and fixed to a cleaned-gas header approximately vertically at an other-side end thereof and a dust containing gas flows from top to bottom in a filtering chamber installed with the respective filter tubes of the filtration apparatus.

* * * * *